US011224172B2

(12) United States Patent
Wang

(10) Patent No.: US 11,224,172 B2
(45) Date of Patent: Jan. 18, 2022

(54) COMPRESSED AIR ARTIFICIAL WIND SYSTEM AND METHOD THEREOF, FIREFIGHTING EQUIPMENT

(71) Applicant: Lifeng Wang, Spånga (SE)

(72) Inventor: Lifeng Wang, Spånga (SE)

( * ) Notice: Subject to any disclaimer, the term of this patent is extended or adjusted under 35 U.S.C. 154(b) by 322 days.

(21) Appl. No.: 16/499,227

(22) PCT Filed: Jan. 23, 2018

(86) PCT No.: PCT/SE2018/000002
§ 371 (c)(1),
(2) Date: Sep. 27, 2019

(87) PCT Pub. No.: WO2018/182475
PCT Pub. Date: Oct. 4, 2018

(65) Prior Publication Data
US 2020/0100436 A1    Apr. 2, 2020

(30) Foreign Application Priority Data

Mar. 29, 2017    (CN) .......................... 201710198564.4

(51) Int. Cl.
*A01G 15/00*    (2006.01)
*A62C 3/02*    (2006.01)
(Continued)

(52) U.S. Cl.
CPC ................ *A01G 15/00* (2013.01); *A62C 3/02* (2013.01); *A62C 3/0207* (2013.01); *F41H 9/04* (2013.01); *A62C 27/00* (2013.01); *F41H 11/02* (2013.01)

(58) Field of Classification Search
CPC ........ A01G 15/00; A62C 3/0207; A62C 3/02; A62C 27/00; F41H 9/04; F41H 11/02
(Continued)

(56) References Cited

U.S. PATENT DOCUMENTS 2,891,624 A    6/1959 McBride
3,128,036 A *  4/1964 McBride .................. B60P 3/14
                                        169/91
(Continued)

FOREIGN PATENT DOCUMENTS

AU    2015200481    8/2016
CN    101274710 A   10/2008
(Continued)

OTHER PUBLICATIONS

International Search Report from PCT/SE2018/000002, dated May 4, 2018, 4 pages.

*Primary Examiner* — Steven J Ganey
(74) *Attorney, Agent, or Firm* — Morgan, Lewis & Bockius LLP

(57) ABSTRACT

The present invention provides a compressed air artificial wind system including compressed air storage device, compressed air discharge device, artificial wind system base and controller; also a firefighting equipment including an extinguishing agent tank and the compressed air artificial wind system. The compressed air storage device includes row tubes and manifolds for production and storage of high/ ultra-high pressure compressed air; the compressed air discharge device includes intake pipe, expansion chamber, Laval nozzle and wind-blowing tube; the artificial wind system base is built as an infrastructure. Large quantity of high/ultra-high pressure compressed air under control from the compressed air storage device and through the compressed air discharge device to spray out generating artificial wind with large air volume and high wind speed for meteorological control, forest firefighting, air defence and coastal defence, respectively.

15 Claims, 6 Drawing Sheets

(51) Int. Cl.
*F41H 9/04* (2006.01)
*A62C 27/00* (2006.01)
*F41H 11/02* (2006.01)

(58) Field of Classification Search
USPC ............ 169/24, 46, 48, 54, 70, 91; 239/2.1, 239/14.1, 77
See application file for complete search history.

(56) References Cited

U.S. PATENT DOCUMENTS

| | | | | |
|---|---|---|---|---|
| 3,724,554 | A * | 4/1973 | Rupert | A62C 27/00 169/24 |
| 5,046,564 | A * | 9/1991 | Poulsen | A62C 3/0207 169/70 |
| 6,866,103 | B2 * | 3/2005 | Ballu | A62C 35/023 169/91 |
| 7,055,615 | B2 * | 6/2006 | Dillman | A62C 3/0292 169/24 |
| 7,562,716 | B2 * | 7/2009 | Lecanu | A62C 3/0207 169/46 |
| 2005/0077055 | A1 | 4/2005 | Celorio-Villasenor | |
| 2017/0007865 | A1 | 1/2017 | Dor-El | |

FOREIGN PATENT DOCUMENTS

| | | |
|---|---|---|
| CN | 201201808 Y | 3/2009 |
| CN | 103463773 A | 12/2013 |
| CN | 203525497 U | 4/2014 |
| CN | 103949026 A | 7/2014 |
| CN | 105649775 A | 6/2016 |
| CN | 205460603 U | 8/2016 |
| CN | 205549295 U | 9/2016 |
| DE | 10051066 A1 | 4/2002 |
| KR | 100986638 B1 | 10/2010 |
| SU | 1644976 A1 | 4/1991 |
| WO | WO 2010/043555 | 4/2010 |
| WO | WO 2016/195564 | 12/2016 |

* cited by examiner

COMPRESSED AIR ARTIFICIAL WIND SYSTEM AND METHOD THEREOF, FIREFIGHTING EQUIPMENT

BACKGROUND

Technical Field

This invention relates to the field of compressed air technology, particularly providing a compressed air artificial wind system and method thereof, and a fire fighting equipment; used for meteorological control, forest fire fighting, air defence and coastal defence.

Description of the Related Art

Meteorological phenomena are all of those phenomena of the atmosphere which occur in the sky as cloud, rain, snow, frost, dew, rainbow, corona, lightning, thunder, etc. The object of meteorology is concerned with studying the laws of "atmospheric motion", for the various meteorological changes in the atmosphere are directly or indirectly dependent upon the "atmospheric motion". As known, wind is actually an air flow. If an artificial wind technology can be provided in a relatively large scale, i.e., an artificial "atmospheric motion" technology in a relatively large scale can be used to a certain extent to adjust in an orientation the "atmospheric motion", or the meteorological trend, to reduce and mitigate natural disasters. Although mankind have been accustomed to using the small wind equipment such as electric fans and blowers for a long time, little has been reported on an artificial wind technology in a relative large scale. This invention intends to provide artificial wind system in a relatively large scale.

The cause of wind is considered to be related to the horizontal pressure gradient force, horizontal deflection force of earth rotation (Coriolis Force), inertial centrifugal force and friction, while the force caused by the inhomogeneous spatial distribution of atmospheric pressure is the driving force of air movement that determines the atmospheric flow field: wind flows from high to low pressure of air, that is, the larger the pressure difference, the higher the wind speed. As a simple plain explanation, the formation of wind is that air blows from "high pressure" to "low pressure". Therefore, an artificial wind system to be provided may take advantage of the great disparity in pressure difference between a large quantity high/ultra-high pressure compressed air and the atmosphere to produce wind.

It is known, traditional engines such as external or internal combustion engines make use of combustion to produce high pressure gases for doing work with output of torque (such as used in automobiles) or thrust (such as used in jet aircrafts and rockets). The key issue troubling the direct use of high/ultra-high pressure compressed air without combustion to do work (output of torque or thrust) is that the cost of large scale production of compressed air is too high because 80-90% of electrical energy consumed during production of compressed air by an air compressor is transferred to heat and wasted. A 2015 authorized patent "A System for Economical Use of Compressed Air as an Automobile Power Source and Method Thereof" (Patent No. ZL201520365135.8, Inventor: Lifeng Wang. PCT/SE2016/000030) discloses a "compressed air production/storage/supply device", which can make use of the electricity difficult to store or that generated during period of off-peak at night to produce and store high/ultra-high pressure compressed air while simultaneously recovering the by-produced heat for central heating, which has solved the problem with that 80-90% of electrical energy consumed during production of compressed air by an air compressor is transferred to heat and wasted as well as the problem with high cost of compressed air production, and which can pressurize and aerate the air storage tubes for the power device of a compressed air automobile to have a non-combustion engine make direct use of high pressure air as its power to output torque. A 2016 authorized patent "A System of Using Compressed Air as a Force Source and Method Thereof, Airplane" (Patent No. ZL201620169386.3, Inventor: Lifeng Wang. PCT/SE2017/000005) discloses a "compressed air production/supply device" and improves with capacity expansion the "compressed air production/storage/supply device" of the previous patent, which can also make use of the electricity difficult to store and that during period of off-peak at night to produce and store high/ultra-high pressure compressed air while simultaneously recovering the by-produced heat for central heating, which has also solved the problem with that 80-90% of electrical energy consumed during production of compressed air by an air compressor is transferred to heat and wasted as well as the problem with high cost of compressed air production, and which can pressurize and aerate the air tank for the compressed air jet engines on an airplane to have another kind of non-combustion engines make direct use of high pressure air as its power to output thrust. In this way, a transition from the traditional technology engines such as external and internal combustion engines to non-combustion engines has been disclosed, but no report has been found for the use of such large production of high/ultra-high pressure compressed air for artificial wind. This invention intends to draw on the structure and functions of "compressed air production/storage/supply device" and "compressed air production/supply device" disclosed in two previous patents to avoid the technical problem with high cost in compressed air production, to focus on designing a large quantity of high/ultra-high pressure compressed air for generating air flow, and to provide a compressed air artificial wind system.

In December 2016 to February 2017, there were several media reports that in order to help clear the smog in Delhi, a group of scientists came up with a "trick": using some retired jet engine to blow away smog. Those scientists included Prof. Moshe Alamaro at the Department of Earth, Atmospheric, and Planetary Sciences, Massachusetts Institute of Technology (MIT, US), and Prof Iyyanki V Muralikrishna at Nehru University of Science and Technology (India) among others. They also hoped that this project will be implemented in China. Under normal circumstances, atmospheric temperature decreases as the altitude increases (a temperature drop of 0.6° C. per 100 m rise), so that the warm air on the ground rises while the cold air at high altitude sinks, forming a convection to favour the dispersion of pollutants. In winter, however, it is very susceptible to the contrary so that atmospheric temperature increases as the altitude increases. This phenomenon is known as "temperature inversion". The atmosphere with temperature inversion occurring is referred to as temperature inversion layer, which appears like a "lid" enveloped at high altitude to impede the air convection so that the pollutants cannot be dispersed but forming smog. Prof. Alamaro's idea was that the retired jet aircraft engines were placed nearby a coal-fired power station to form a "virtual chimney", through which the pollutants resulted from the power station would be blown out of the temperature inversion layer, so hopefully that such an "artificial wind" will blow away the smog. The sceptics against this project are primarily concerned with the following issues: a retired jet engine consumes a large amount of fuel to cause air pollution by itself, produces tremendous noises but does not have enough power to strike pollutants out of Delhi's temperature inversion layer, and the cost is extremely expensive and difficult to bear . . . . And these flaws are also a part of the relevant technical problems to be solved by the compressed air artificial wind system provided in this invention. A large quantity of high/ultra-high pressure compressed air to form a wind at high speed of large airflow is not what the retired jet engine can match.

It is well known that forests are important in national economy, not only supplying wood and forest by-products needed for national constructions and people's lives, but also play multiple roles in releasing oxygen, adjusting climate, conserving water source, stabilizing soil and moisture, windproof and dune-fixing, landscaping, purifying air, reducing noise, and travel healthcare. However, forest fire topes three natural disasters of forest destruction (diseases, pests and fires), and also directly threaten the safety of people's lives and properties. To fight the forest fires, the general uses are manual extinguishing and sprinkler. In Canada, Japan, the United States and other developed countries, the solutions of chemical fire extinguishers are also commonly used, that is by adding various fire retardant chemicals in the water for a small spray to spray (the spraying area is extremely limited because the spray flow and speed are limited) . . . lacking a good way of firefighting. One may always read the media reports that in the United States, Canada, Australia, Russia, Indonesia, Spain, China, France, Portugal and Sweden among others, there occur forest fires, lasting long and difficult to fight. This invention is to provide a compressed air artificial wind system, as providing a large quantity of high speed airflow to the giant sprayers for sprinkling fire extinguishers to fight fire in huge area as it is desired.

Since ancient times, the military and meteorological phenomena have got an indissoluble bond, always for the militarists to take a great account. Numerous battles in the history have been seen as the meteorological phenomena such as heavy rain flood, typhoon, frigidity, heat, fog and their resulting diseases made impacts on the war. For example, on 18 Jun. 1815, the eve of decisive battle for the famous Waterloo campaign, a heavy rain suddenly fell and French reinforcements failed to arrive, causing a great loss of Napoleon. On 4 Dec. 1941, Hitler's troops besieged the city of Moscow but could not stand the cold weather while the temperature fell below −30° C., resulting in petrol coagulating, cannon sights failing, and 110 thousands of soldiers frostbiting, so that the German troops were defeated after Soviet military launched a major counter-offensive. On 29 Aug. 1776, during the American War of Independence, Georgy Washington was trapped near New York at night but escaped thanks to a dense fog . . . . The application prospect of artificial wind in military will go without saying.

BRIEF SUMMARY

Technical Problems to be Solved

The object of this invention is to provide a compressed air artificial wind system to solve the technical problem of forming artificial wind with a large quantity of high-speed airflow of high/ultrahigh pressure compressed air for civilian and military multiple uses in meteorological control, forest firefighting, air defence and coastal defence and the like.

Technical Solutions

To solve the above mentioned technical problem, a compressed air artificial wind system including compressed air storage device, compressed air discharge device, controller and artificial wind system base is provided by this invention;

The compressed air storage device includes a plurality of sets of row tubes and manifolds located at two ends of each set of the row tubes, wherein a plurality of manifolds corresponding to the inlet ends of the plurality of sets of the row tubes are communicated with each other through a first connecting pipe, and a plurality of manifolds corresponding to the outlet ends of the plurality of sets of the row tubes are communicated with each other through a second connecting pipe. The compressed air storage device further includes an inlet and an outlet, wherein the inlet is set on the manifold communicated with the inlet ends of the row tubes, and the outlet on the manifold communicated with the outlet ends of the row tubes; the inlet is equipped with an inlet valve for storing the compressed air after its entering, and the outlet with an outlet valve for discharging the compressed air from the compressed air discharge device;

The compressed air discharge device includes an intake pipe, an expansion chamber, a Laval nozzle and a wind-blowing tube; the first end of the intake pipe is communicated with the outlet of the compressed air storage device, and the second end of the intake pipe is communicated with the first end of the expansion chamber; the inner wall of the expansion chamber is provided with an air injection regulator which is used for regulating the pressure and flow of compressed air injected into the expansion chamber from the intake pipe; a second end of the expansion chamber is communicated with the first end of the Laval nozzle, and the first to second end of the Laval nozzle sequentially includes a convergent section, a throat section and a divergent section, and the second end of the Laval nozzle is continuous with the proximal end of the wind-blowing tube and the distal end of the wind-blowing tube is a tube mouth opened to the outside;

The artificial wind system base is provided on the bottom of the compressed air artificial wind system and its peripheral side;

The controller is used for controlling the sequential discharge of the compressed air from the compressed air storage device to the wind-blowing tube via the inlet pipe, the expansion chamber, and the Laval nozzle, and discharging in a target direction led by the wind-blowing tube.

Preferably, the expansion chamber is cylindrical or spherical.

Preferably, the wind-blowing tube is a tubular structure with adjustable length.

Preferably, the wind-blowing tube is a telescopic tube including two or more sleeve sections sleeved together.

Preferably, the artificial wind system base includes a host chassis, a base connecting part and a base bearing part; the host chassis is a metal plate structure, and the compressed air storage device, the compressed air discharge device and the controller are provided on the host chassis, and the base connecting part is located below the host chassis and around the bottom of the host chassis, and a buffer shock-absorbing structure is provided between the base connecting part and the host chassis; the base bearing part is provided beneath the base connecting part.

Preferably, a base shaft is arranged between the base connecting part and the host chassis, wherein the base connecting part is fixedly connected with the base shaft, and the base shaft is rotatably connected with the host chassis through a bearing such that the direction of the wind-blowing tube of the compressed air discharge device can rotate in a plane with the base shaft as a center.

Preferably, the base bearing part is land, island reef, seabed reef or vehicle chassis, wherein the vehicle chassis is the chassis for the semi-tracked, tracked, wheel-type or railed vehicles, and a parking hoe for limiting vehicle movement is mounted at the rear end of the vehicles.

Preferably, a supporting mechanism is fixedly arranged on the base bearing part and movably connected with both sides of the wind-blowing tube through a trunnion, and/or a lifting mechanism is provided on the side of the artificial wind system base facing the tube mouth of the wind-blowing tube, so that the direction pointed by the wind-blowing tube can be controlled within a certain angle for its pitching change.

This invention also provides a firefighting equipment including an extinguishing agent tank and the compressed air artificial wind system mentioned above;

The wind-blowing tube is provided at its one end close to the Laval nozzle with a segment of oblique slit passage which penetrates the wind-blowing tube wall extending obliquely from the outside of the wind-blowing tube wall toward the inside of the wind-blowing tube wall and away from the Laval nozzle, and the oblique slit passage is communicated with the extinguishing agent tank through an extinguishing solution transport pipeline, which forms a T-shaped connecting pipe with the wind-blowing tube at the outer opening of the oblique slit passage.

Further, the compressed air artificial wind system can be classified as meteorological control artificial wind system, forest firefighting artificial wind system, air defence artificial wind system and coastal defence artificial wind system and the like according to its usage, and the actually used setting site of the compressed air artificial wind system is referred as practical setting point of the compressed air artificial wind system;

Wherein, many practical setting points for meteorological control are distributed, and at each such practical setting point a plurality of meteorological control artificial wind systems may be provided to generate the artificial wind of high-speed airflow in large quantity of high/ultra-high pressure compressed air blown to the sky by these meteorological control artificial wind systems to benignly regulate the meteorological trends;

Wherein, the firefighting equipment provided by this invention is applied to the forest firefighting artificial wind system, wherein the extinguishing agent solution flows into the wind-blowing tube via the extinguishing solution transport pipeline and oblique slit passage under the pressure of the extinguishing agent tank and is mixed with high-speed airflow ejected from the Laval nozzle, immediately torn into extinguishing agent solution droplets by high-speed airflow, and sprayed out from the wind-blowing tube to the fire field together with the high-speed airflow, so that the flames in the fire field that extinguishing agent chemicals reaches is retarded, the temperature drops rapidly to cool the fire field when the spouted high/ultra-high pressure compressed air rapidly expands at the place that it reaches, and the water, the main component of the extinguishing agent solution, sprayed onto the fire field also cools the combustibles and increases their humidity, which achieve the large-scale forest fire extinguishing effect;

Wherein, several practical setting points for air defence are fortified at the front or periphery of military stronghold, political/economic center, and each such practical setting point is provided with a plurality of air defence artificial wind systems that eject the high/ultra-high compressed air to the sky and continuously change the direction, frequency and pressure of the high-speed airflow ejected, causing "wind shear" and "turbulence" at high altitude, resulting in the occurrence of sudden changes in wind speed, wind direction, wind power, air pressure, temperature, humidity, and density in the relevant airspace, thereby disrupting the guidance trajectory of the missile passing by and causing the enemy aircraft passing through to damage and crash;

Wherein, the practical setting points for coastal defence are distributed at the coastal front, and each point is provided with one or more coastal defence artificial wind systems with their base bearing part fixed on the island reefs or seabed reefs, in the wartime, the wind-blowing tube of the coastal defence artificial wind system aiming at an invading enemy warship side ejects the high-speed airflow of high/ultra-high pressure compressed air, that is, the artificial wind direction is towards the invading enemy warship side, intensely disturbs the sea water causing huge fluctuations in the sea water from the sea surface to the inside with the propagation direction of the water wave in conformity with the high-speed airflow and wind direction, rushing to the enemy warship side, thereby causing the enemy warship to be seriously rolled, or even capsized.

This invention also provides a method for operating the compressed air artificial wind system, comprising the following steps:

S1, open inlet valve of compressed air storage device, while close outlet valve of compressed air storage device; make use of night off-peak or other powers difficult to store such as wind power or solar energy for high/ultra-high pressure air compressor 30 to pressurize and aerate air through air compressor discharge port and the inlet of compressed air storage device into the compressed air storage device in the large-scale flow water tank; control the pressure and volume of the air filled to suit the flow of cooling water into water inlet of large-scale flow water tank and of hot water from its water outlet, so that the heat generated in the production process of compressed air in the compressed air storage device 1 is taken away by the cooling water in time, and the cooling water is heated to become hot water at an appropriate temperature, flowing out of water outlet at the right time to the heating system, until a large amount of compressed air, substantially remaining at normal temperature in the compressed air storage device, reaches the designed high pressure, and store it for future use;

S2, when the practical setting point of compressed air artificial wind system is not at the site for compressed air production, the compressed air storage device is detached from large-scale flow water tank, and then covered by a compact and lightweight protective shell, transported by a vehicle or ship to a relevant practical setting point of the compressed air artificial wind system, and connected and assembled with the corresponding compressed air discharge device, controller and artificial wind system base, and adjusted to be ready for use at the practical setting point for compressed air artificial wind system; when practical setting point of compressed air artificial wind system is at the site for compressed air production, compressed air storage device is connected and assembled in situ with the corresponding compressed air discharge device, controller and artificial wind system base 3, and adjusted to be ready for use;

S3, the compressed air artificial wind systems for various usages controlled by respective controllers, a sufficient amount of high/ultra-high pressure compressed air stored in the compressed air storage device is discharged through compressed air discharge device to spray the artificial wind to the target direction for meteorological control, forest firefighting, air defence and coastal defence, respectively.

Beneficial Effects

The above technical solution of this invention has the following advantages over the prior art:

The compressed air artificial wind system provided by this invention comprises a compressed air storage device in a tubular structure, which is connected to a compressed air discharge device equipped with a Laval nozzle so as to produce an artificial wind of large-flow and high-speed airflow with a large quantity of high/ultra-high pressure compressed air.

The said artificial wind speed is high for at least two reasons:

Firstly, the pressure difference is large. The pressure difference between the pressure of high/ultra-high pressure compressed air in the said compressed air storage device and the atmospheric pressure outside the tube mouth of the wind-blowing tube is very large. Air pressure difference is the driving force of air movement. The formation of wind is that air flows from high to low pressure, that is, the larger the air pressure difference, the higher the wind speed. The pressure of high/ultra-high pressure compressed air in the said compressed air storage device is about ≥100 MPa, while the pressure of the external atmosphere is about 0.1 MPa, different by 1000 times. Specific values can be used to further measure the comparison. The pressure of high/ultra-high pressure compressed air in compressed air storage device 100 MPa=1000000 hpa, while the standard pressure of the external atmosphere 1013.25 hpa, different in 998987 hpa, which is such a large pressure difference as can be seen from the following two points: ① the interpretation of isobaric graph, such as reading a ground horizontal pressure distribution map of the northern hemisphere, it can be seen that, often for hundreds of kilometers apart, the pressure difference is less than 5 hpa, ② the well-known "land and sea breezes", which means that the land breeze blows during the day while the sea breeze blows during the night, result only from a change in pressure <5 hpa per day. If a pressure difference of 998987 hpa is used to produce a wind, the wind speed is naturally very high.

Secondly, the role of the said Laval nozzle: the cross-sectional area of Laval nozzle (also known as convergent-divergent nozzle), invented by a Swedish man Gustav de Laval, is first converged and then diverged, consisting of a convergent-throat-divergent, is a "flow velocity amplifier"; under the pressure in the expansion chamber, the compressed air flow at first enters the convergent section, where upon Bernoulli's principle that "the flow, when moving in a tube, has a larger flow velocity where the cross-section of the tube is smaller and a smaller flow velocity where the cross-section of the tube is larger", the airflow continues to accelerate, and when reaching the throat, it can have a flowrate exceeding the sound velocity (>340 m/s). The transonic flow, however, does not any longer follow the principle of that "the flow, when moving in a tube, has a larger flow velocity where the cross-section of the tube is smaller and a smaller flow velocity where the cross-section of the tube is larger" but on the contrary, that is, the larger the cross-section of the tube, the faster the flow speed; then in the divergent section, the airflow, which has reached the supersonic velocity, further accelerates (for example, 400-500 m/s), the flow speed is extremely high when being ejected from the said wind-blowing tube.

The said artificial wind has a large quantity because a large amount of compressed air can be discharged from one or more compressed air storage devices almost with no upper limit. The reason why such a large amount of compressed air can be discharged is that the production cost of compressed air in the compressed air storage device is very low, also with an economical return: the said high/ultra-high pressure air compressor (operating pressure close to or equal to or exceed 100 MPa) in this invention can make use of the electricity generated during period of off-peak at night or that difficult to store such as wind power or solar energy to pressurize and aerate the said compressed air storage devices, and a large amount of thermal energy (corresponding to 90% of the electric energy consumed) by-produced during the production of high/ultra-high pressure air in the compressed air storage devices can be recovered for central heating in a clean manner. Such compressed air is economical, inexpensive, energy-saving and environmental, and so more is better, with no upper limit, and the said artificial wind can have a large quantity.

Meteorological changes take place in the "atmospheric motion". According to the corresponding meteorological research, computer simulation, historical experience summary and realistic measurement data, a large quantity of high-speed artificial wind produced by the said meteorological control artificial wind system can be used to directly or indirectly affect, or to regulate in orientation to a certain extent, the "atmospheric motion" and meteorological trend, for mitigating and circumventing natural disasters.

This invention provides the firefighting equipment, comprising a compressed air artificial wind system and an extinguishing agent tank communicated with an wind-blowing tube; the said forest firefighting artificial wind system applies the said firefighting equipment both to be capable to sprinkle the extinguishing agent solution over a large area of fire, and to accurately spray the extinguishing agent toward the scattered residual fire in forest, thereby shortening the time of firefighting, reducing the over-fire area, and improving the firefighting efficiency.

The said compressed air artificial wind system can be applied to the air defence and coastal defence, with a certain military significance, psychologically at first. For the nuclear war that may occur in the future, either as an initiator or as a responding player, one is concerned most with the "second strike", a nuclear strategic term. The second strike capability refers to the ability of nuclear warfare to survive and strike back after being attacked by the enemy's first nuclear attack. From a nuclear deterrence point of view, the stronger the secondary strike capability, the smaller the chances of a nuclear war between the two countries, meaning that a more stable nuclear equilibrium will be reached. The use of air/coastal defence artificial wind systems can make the party who attempts to strike first realize ineffectiveness of the so-called precision strike from the air, and possibility of immediate loss in naval advantage, thus having fear to take action.

When the said compressed air artificial wind system is used for air defence, in the airspace above the air defence artificial wind system, the wind direction, speed and force, as well as air pressure, temperature, humidity and density, are all abruptly changing to disrupt the guidance track of the passing missiles, and to cause damage to the passing enemy planes to crash.

The beneficial effects of the said compressed air artificial wind system applied to coastal defence are related to the formation of sea waves. The sea wave is a fluctuation phenomenon occurring in the oceans. The wind waves are fluctuation of seawater affected by the action of wind force, propagating in the same direction as the wind direction. The waves leaving the wind are called surges. The relationship between wind and waves can refer to the authoritative Beaufort wind force scale, the wind rating by Francis Beaufort of Great Britain in 1805 on the basis of the extent of wind's influence on the objects on the ground or sea surface. According to its strength, the wind force is classified to the "0" to "12", 13 scales in total, which is classification currently recommended by the World Meteorological Organization. For example, five scales of the parameters are listed as follows:

Beaufort-scale 0 wind speed 0-2 km/h (equivalent to 0-0.5 m/s) Wave height 0 m,

Beaufort-scale 3 wind speed 13-19 km/h (equivalent to 3.6-5.2 m/s) Wave height 0.6 m, Beaufort-scale 7 wind speed 52-62 km/h (equivalent to 14.4-17.2 m/s) Wave height 4 m, Beaufort-scale 10 wind speed 88-103 km/h (equivalent to 24.4-28.6 m/s) Wave height 9 m, Beaufort-scale 12 wind speed 118+ km/h (equivalent to 32.7+m/s) Wave height 14+m, Note: The relationship between wind speed and wind scale is $V=0.836\times(B3/2)$, where V=wind speed m/s, B=wind scale; wind speed refers to a point of 10 meters above sea level. As seen, when the wind speed accelerates from 0-0.5 m/s to 32.7+m/s, wave height increases from 0 m to 14+m. It is conceivable that when an wind-blowing tube of the said coastal defence artificial wind system mounted on an island reef is placed at a height of 2-5 m above sea level (closer to the sea than that of 10 m above the sea level) to point an enemy warship, a large quantity of artificial wind is emitted toward the enemy warship at an wind speed of 400-500 m/s (10 times more than the wind speed of scale 12), and how high waves will flock to the enemy warship.

In the broad sense, moreover, the waves also include tsunamis, storm surges and ocean internal waves among others caused by the actions of external and internal forces such as celestial gravitation, seabed earthquakes, volcanic eruptions, collapse landslides, atmospheric pressure variations and unequal distribution of seawater density, all of which cause great fluctuations of seawater. When an wind-blowing tube of the said coastal defence artificial wind system invisibly mounted on a seabed reef is directed from a depth below the sea surface to emit a large quantity of high-speed artificial wind at a certain frequency toward the enemy warship, there are fluctuations everywhere from the sea surface to its interior, especially those propagating to the side of the enemy warship to cause its resonance, will cause the enemy warship serious rolling and even overturn.

Figure 1:
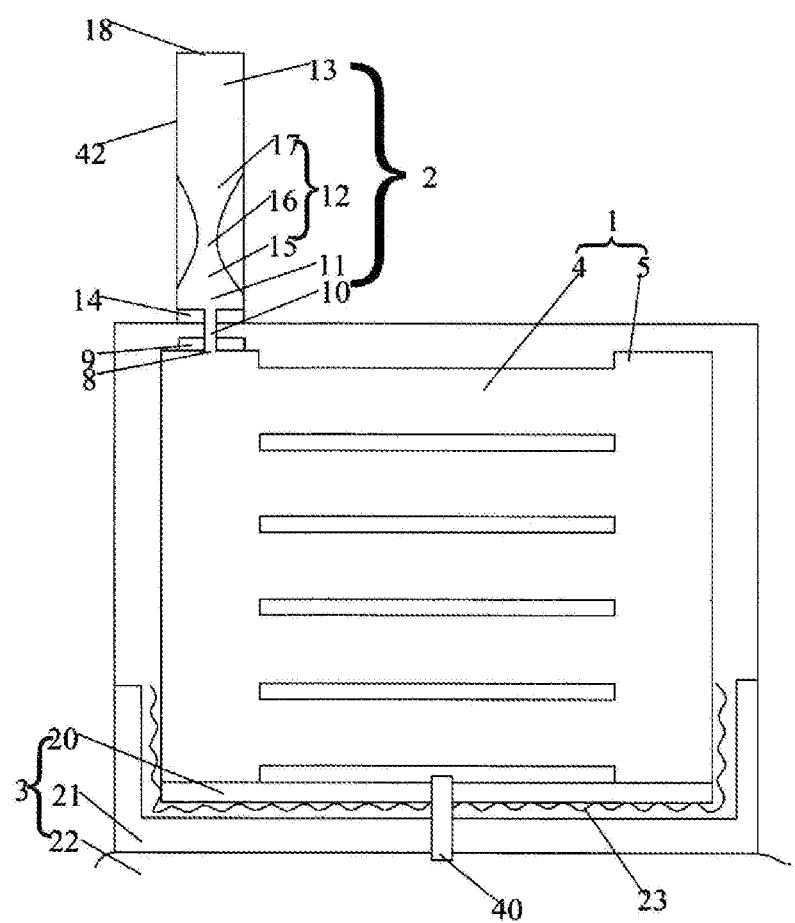
FIG. 1 is a structure schematic diagram of the compressed air artificial wind system in Embodiment of this invention.

| Description of the reference numbers | | | |
|---|---|---|---|
| 1 | compressed air storage device | 2 | compressed air discharge device |
| 3 | artificial wind system base | 4 | row tubes |
| 5 | manifolds | 6 | inlet |
| 7 | inlet valve | 8 | outlet |
| 9 | outlet valve | 10 | intake pipe |
| 11 | expansion chamber | 12 | Laval nozzle |
| 13 | wind-blowing tube | 14 | air injection regulator |
| 15 | convergent section | 16 | throat section |
| 17 | divergent section | 18 | tube mouth |
| 19 | first connecting pipe | 19a | second connecting pipe |
| 20 | host chassis | 21 | base connecting part |
| 22 | base bearing part | 23 | buffer shock-absorbing structure |
| 24 | island reef | 25 | seabed reef |
| 26 | vehicle | 27 | meteorological control artificial wind system |
| 28 | coastal defence artificial wind system | 29 | practical setting point |
| 30 | high/ultra-high pressure air compressor | 31 | large-scale flow water tank |
| 32 | air compressor discharge port | 33 | cooling water |
| 34 | water inlet | 35 | hot water |
| 36 | water outlet | 37 | inner sleeve |
| 38 | middle sleeve | 39 | outer sleeve |
| 40 | base shaft | 41 | parking hoe |
| 42 | wind-blowing tube wall | 43 | oblique slit passage |
| 44 | outer opening | 44a | inner opening |
| 45 | extinguishing solution transport pipeline | 46 | high-speed airflow |
| 47 | extinguishing agent tank | 47a | extinguishing agent solution |
| 47b | extinguishing agent solution droplets | 48 | associate wind-blowing tube |
| 49 | associate compressed air storage device | 50 | associate extinguishing agent tank |
| 51 | associate extinguisher solution transport passage | 52 | enemy warship |

-continued

Description of the reference numbers

| 53 | wind direction | 54 | dark cloud |
| 55 | arid region | 56 | trend of southward drift |
| 57 | artificial wind | 58 | westward drift |
| 59 | rains | 60 | the original arid region |
| 61 | distance | 62 | below the sea surface |
| 63 | seawater fluctuations | | |

DETAILED DESCRIPTION

Hereinafter, this invention will be described further in detailed embodiments referring to the drawings. The following embodiments illustrate this invention but are not intended to limit the scope of this invention.

To make the objectives, technical solutions, and advantages of the embodiments of this invention more comprehensible, the technical solutions in the embodiments of this invention are clearly and completely described with reference to their drawings as follows. Apparently, the described embodiments are not all embodiments of this invention but a part of them. Based on the embodiments of this invention, all of other embodiments obtained by a person of ordinary skill in the field without creative efforts shall fall within the protection scope of this invention.

As shown in FIGS. 1-6, an embodiment of this invention provides a compressed air artificial wind system including compressed air storage device 1, a compressed air discharge device 2, a controller, and an artificial wind system base 3.

Figure 2:
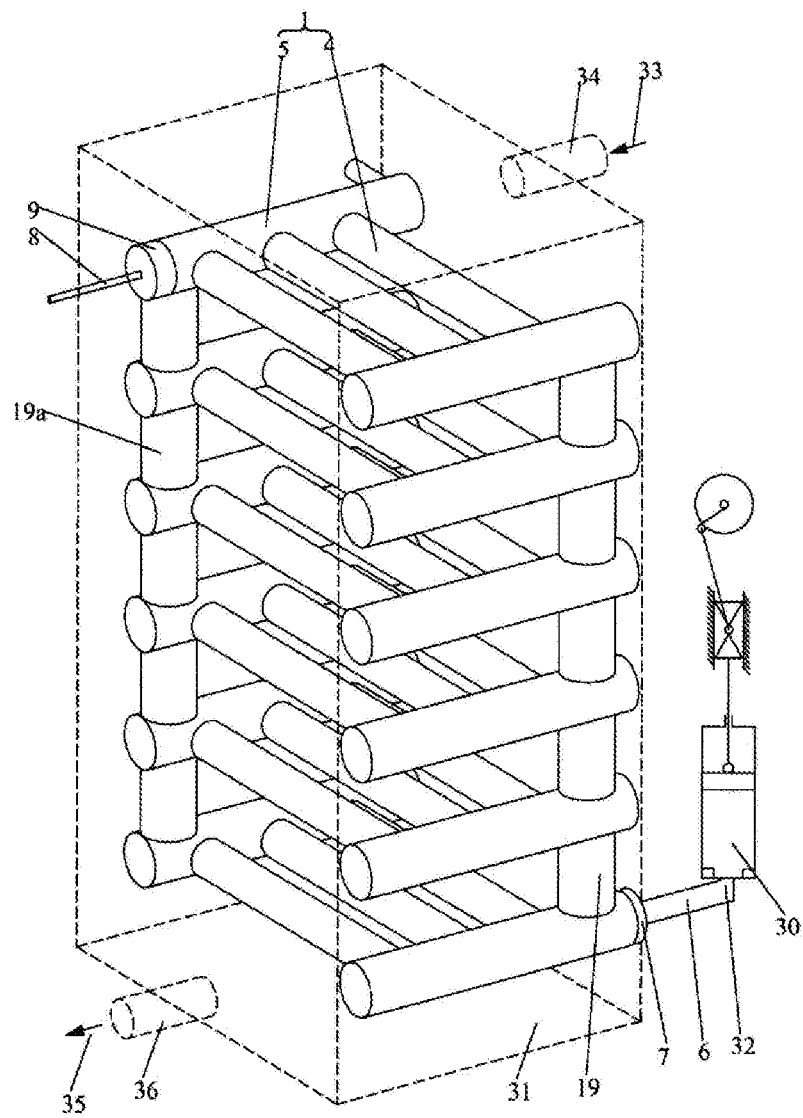
FIG. 2 is a three-dimensional bevel view of the compressed air storage device producing compressed air in Embodiment of this invention.

As shown in FIG. 1 and FIG. 2, the compressed air storage device 1 includes a plurality of sets of row tubes 4 and manifolds 5 located at two ends of each set of the row tubes. The manifolds corresponding to the inlet ends of the plurality of sets of the row tubes are communicated with each other through a first connecting pipe 19, and a plurality of manifolds corresponding to the outlet ends of the plurality of sets of the row tubes are communicated with each other through a second connecting pipe 19a. The compressed air storage device 1 further includes an inlet 6 and an outlet 8, wherein inlet 6 is set on a manifold 5 communicated with the inlet ends of row tubes 4, and outlet 8 on a manifold 5 communicated with the outlet ends of row tubes 4; inlet 6 is equipped with an inlet valve 7 for storing the compressed air after its entering, and outlet 8 with an outlet valve 9 for discharging the compressed air from the compressed air discharge device 2.

As shown in FIG. 1, the compressed air discharge device 2 includes an intake pipe 10, an expansion chamber 11, a Laval nozzle 12 and a wind-blowing tube 13. The first end of intake pipe 10 is communicated with outlet 8 of the compressed air storage device 1, and the second end of intake pipe 10 is communicated with the first end of the expansion chamber 11, in cylindrical or spherical shape; the inner wall of expansion chamber 11 is equipped with an air injection regulator 14, used for regulating the pressure and flow of the compressed air injected from intake pipe 10 into expansion chamber 11; volume of expansion chamber 11 is so sized as to ensure the compressed air injected from intake pipe 10 into expansion chamber 11 maintaining design pressure. The second end of expansion chamber 11 is communicated with the first end of Laval nozzle 12. From the first end to second end of Laval nozzle 12, there are sequentially included convergent section 15, throat section 16 and divergent section 17. The second end of Laval nozzle 12 is extended to the proximal end of wind-blowing tube 13.

Figure 3A:
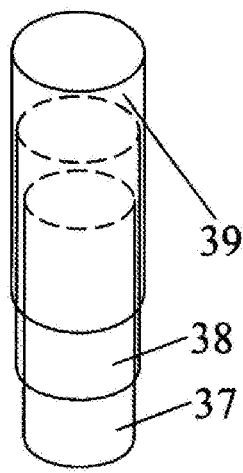
FIG. 3a is a structure schematic diagram of the wind-blowing tube without elongation in Embodiment of this invention.
Figure 3B:
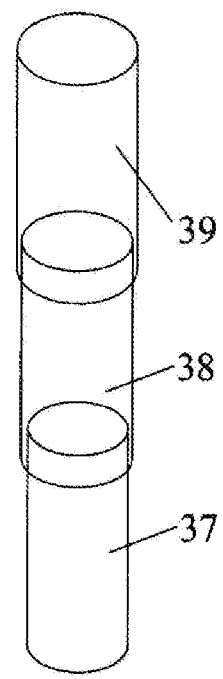
FIG. 3b is a structure schematic diagram of the wind-blowing tube elongation in Embodiment of this invention.

As shown in FIG. 1, FIGS. 3a and 3b, wind-blowing tube 13 can be designed in a fixed cylinder structure, or in a tubular structure with adjustable length, and the distal end of wind-blowing tube 13 is tube mouth 18 open to the outside.

Figure 5:
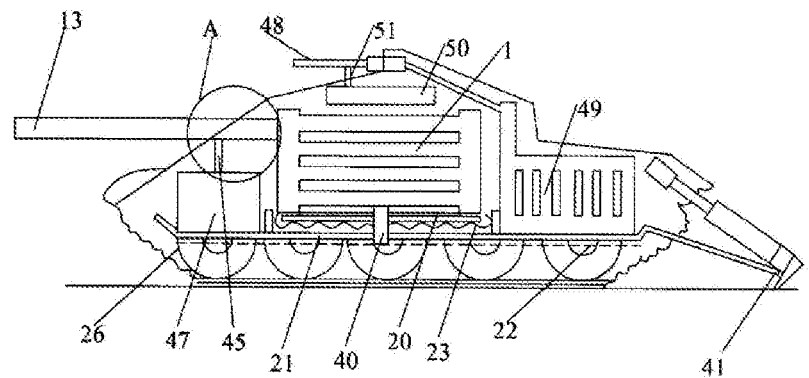
FIG. 5 is a structure schematic diagram side view of the firefighting equipment in Embodiment of this invention.
Figure 6:
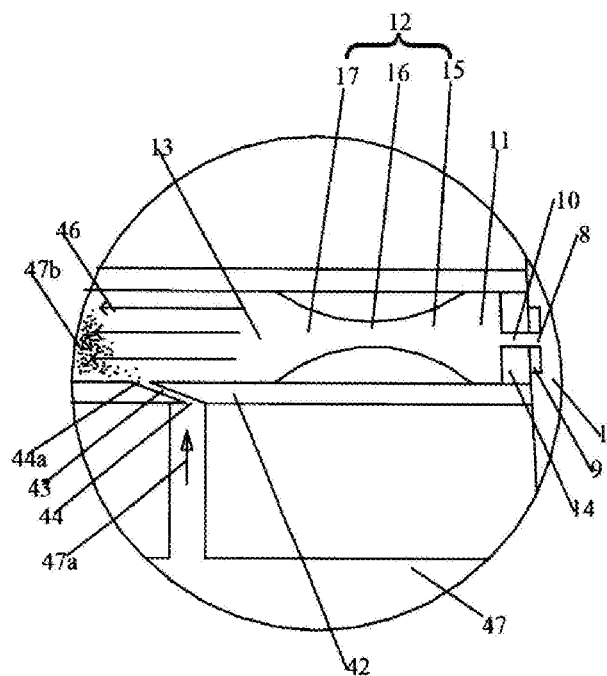
FIG. 6 is an enlarged side view of the oblique slit passage of A-section of FIG. 5.

The artificial wind system base 3 is built on the bottom of the said compressed air artificial wind system and its bottom sides. As shown in FIG. 1, and FIG. 5, artificial wind system base 3 comprises a host chassis 20, a base connecting part 21 and a base bearing part 22; the said host chassis 20 is a metal plate structure, on which settled are the said compressed air storage device 1, compressed air discharge device 2 and controller; the said connecting part 21 is located beneath host chassis 20, and between the base connecting part 21 and the host chassis 20 a buffer shock-absorbing structure 23 is arranged; the said base bearing part 22 is located beneath base connecting part 21 and its bottom sides. The base bearing part 22 may be classified into a stationary base bearing part and a carrier base bearing part, wherein the former is fixed to land, island reef 24 or seabed reef 25, and the latter can be a mobile vehicle for its use.

The controller is used to control a sequential discharge of the high/ultra-high pressure compressed air from compressed air storage device 1, through intake pipe 10, expansion chamber 11 and Laval nozzle 12 to wind-blowing tube 13, in the target direction guided by the length, elevation and direction angle of the wind-blowing tube 13.

The said compressed air artificial wind system can be classified as meteorological control artificial wind system 27, air defence artificial wind system, coastal defence artificial wind system 28 and the likes according to their usages; wherein its practical set location is termed as practical setting point 29 of the compressed air artificial wind system.

When it is used to produce high/ultra-high pressure compressed air, as shown in FIG. 2, the compressed air storage device 1 described in this embodiment is built in a compressed air production device, comprising a high/ultra-high pressure air compressor 30, a large-scale flow water tank 31, and the compressed air storage device 1 installed in the tank 31; the said high/ultra-high pressure air compressor 30 has an operating pressure around 100 MPa, and an air compressor discharge port 32 is detachably connected to the inlet 6 of the said compressed air storage device 1 and is used for pressurizing and aerating the compressed air storage device 1. The said large-scale flow water tank 31 is equipped with a water inlet 34 for cooling water 33 to flow in, and a water outlet 36 for hot water 35 to flow out, wherein the water outlet 36 is communicated with a heating system;

The traditional technology of compressed air production is confronted with the problem that "90% of the electric energy consumed by air compressor is transformed into heat energy", difficult in concentrating utilization and causing a high production cost. On the other hand, (a great demand for heating in society has made the heat sources in shortage, coal and fuel heating with serious greenhouse gas emissions and environmental pollutions, (a large amount of off-peak electricity worldwide is unused every year, and so its electricity price is about ⅓ of the peak electricity. When the said compressed air storage device 1 in this invention is used to produce high/ultra-pressure compressed air, the possible waste heat energy transformed from the 90% of the electric energy consumed by air compressor during the compressed air production can be applied to central heating system, both economically and environment-friendly, also with an extensive use of the economical night off-peak electricity and other powers difficult to store such as wind power or solar energy, thus more "cost-effective".

In addition, the said compressed air storage device 1 in this invention is integrated by row tubes 4 and manifolds 5 used for producing and storing high/ultra-high pressure compressed air, which not only facilitates the heat exchange for cooling water 33 to collect heat, but also tolerates the storage of relatively higher pressures compressed air with a much smaller diameter in the tubular structure of compressed air storage device 1, in comparison to those of the high pressure compressed air reservoirs of the same capacity (in the case of the same material) based on the conventional technology, as revealed by the common sense and stress analysis. For example, there is an equation for tube bearing pressure in material mechanics, $$P=(2*\sigma/S*\delta)/D$$

where P stands for pressure, $\sigma$ for tensile strength, S for safety factor, $\delta$ for wall thickness, and D for outer diameter of the tube.

After the compressed air storage device 1 is filled with high/ultra-high pressure compressed air, the water in large-scale flow water tank 31 is evacuated, and the tank body is removed for replacement with a compact and lightweight protective shell (not shown) outside the compressed air storage device 1, and then the compressed air storage device 1 is transported by a vehicle or ship to the corresponding practical setting point 29 of the compressed air artificial wind system. At the practical setting point 29, the compressed air storage device 1 is connected and assembled with the corresponding compressed air discharge device 2, controller and artificial wind system base 3, and adjusted to be ready for use. The said compressed air storage device 1 can also be used in a compressed air production place for being connected and assembled in situ with the corresponding compressed air discharge device 2, controller and artificial wind system base 3 and adjusted to be ready for use.

As shown in FIG. 1, FIGS. 3a and 3b, and FIG. 5, the wind-blowing tube 13 in this embodiment is a telescopic wind-blowing tube, comprising two or more sleeve segments sleeved together. In this embodiment, it includes an inner sleeve 37, a middle sleeve 38 and an outer sleeve 39 sleeved one by one, and the cylinder length is adjusted by adjusting the overlapping lengths of the inner, middle and outer sleeves. The said multi-layer sleeves can be stretched with layer by layer toward the distal end, and the total length of the multi-layer sleeves can be prolonged with reducing the overlapping portions of the sleeve layers; in contrast, the said multi-layer sleeves are retracted under control with layer by layer to reset toward the proximal end, and the total length of the multi-layer sleeves can be shortened with increasing the overlapping portions of the sleeve layers to restore the initial length. The elevation adjustment of wind-blowing tube 13 can be controlled for its pitching movement at a certain angle in its vertical plane and for its locking at a defined angle through a adjusting mechanism. For example, a supporting mechanism is fixedly arranged on the said base bearing part 22 and is flexibly connected through a trunnion (not shown) with both sides of wind-blowing tube 13, and/or a lifting mechanism is arranged on the side of the artificial wind system base 3 facing the tube mouth 18 of wind-blowing tube 13, so that the direction pointed by wind-blowing tube 13 can be controlled within a certain angle for its pitching change.

A base shaft 40 is arranged between the said base connecting part 21 and the host chassis 20. The said base connecting part 21 is fixedly connected to base shaft 40, which is rotatably connected through a bearing to the host chassis 20. The host chassis 20 can be controlled to rotate in a plane with base shaft 40 as its center at an angle to the target direction pointed by the projection of wind-blowing tube 13, and then the host chassis 20 can be locked with base connecting part 21. The adjustment and control of length, elevation and direction angle of the adjustable wind-blowing tube can be driven by manual operation or power, such as a simple mechanical transmission device operated by a hand wheel, or a hydraulic or electric power drive device controlled remotely.

The said base bearing part 22 preferably employs a vehicle chassis, preferably the chassis of a half-tracked, tracked, wheeled or railed vehicle 26, wherein the trailing end of vehicle 26 is equipped with a parking hoe 41 for limiting vehicle movement. When a vehicle-mounted compressed air discharge device 2 and compressed air storage device 1 are in operation, vehicle 26 is braked and stopped to stabilize and support itself subjected to the reaction force due to the discharge of compressed air. The parking hoe 41 installed on the rear end of vehicle 26 can limit its movement, and other measures may also be taken to fasten vehicle 26 on land.

As shown in FIG. 1, FIGS. 3a and 3b, FIGS. 4a, 4b and 4c, a meteorological control artificial wind system 27 described in this embodiment has a compressed air storage device 1 of large capacity, a Laval nozzle 12 of good performance for airflow acceleration, and a long wind-blowing tube 13. The base bearing part 22 in the said meteorological control artificial wind system 27 may be a stationary base bearing part or a carrier base bearing part. At each practical setting point 29, several meteorological control artificial wind systems 27 may be provided to work together in a group to discharge to the sky an enough quantity of high-speed airflow of high/ultra-high pressure compressed air for generating artificial wind, and for a good adjustment of the meteorological trends. According to the deployment distribution of practical setting points 29, meteorological control artificial wind systems 27 can be classified as global distribution, regional distribution and local utilization.

Wherein, the deployment range of practical setting points 29 for global or regional distribution of meteorological control artificial wind systems 27 involves whole world or a large region, where number of practical setting points 29, site selection and how to discharge compressed air are proposed by a global or regional coordination institution according to the corresponding meteorological science research, computer simulation, historical experience summary and realistic measurement data, to perform a good adjustment of the global or regional meteorological changes. The practical setting points 29 for local utilization of meteorological control artificial wind systems 27 are distributed in a limited location, where there may be one or several practical setting points 29 for a good adjustment of the local meteorological changes.

According to the above principles, there is a demand for a wide range of experimental studies on the application of artificial wind, generated in a large quantity and at high speed by the said meteorological control artificial wind systems 27. For instance, A. In comparison to one still in reporting that Prof. Moshe Alamaro, a MIT US scientist, tried to use a retailed jet engine to blow off smog in India, the said meteorological control artificial wind systems 27 has many advantages:

1) The jet engine consumes a large amount of fuel and so causes air pollution, while the meteorological control artificial wind systems 27 consumes no fuel and causes zero pollution, this is indeed a very big difference. Some people may suggest that the comparison should include the comparative calculations of the energy consumption and emission during early productions of fuel and compressed air. Then, the fuel production is one of "Well to Tank" including exploration, mining and chemical refinery, while the production of compressed air in the tubular structure of the compressed air storage device 1 makes use of night off-peak electricity or other powers difficult to store such as wind power or solar energy, with 90% of the consumed energy to be recovered for clean heating, so that the differences in overall energy consumptions and emissions between two approaches are more significant.

2) The jet engine produces huge noise, depending on the deflagration and chemical reactions of fuel-oxidant in the combustion chamber, while the said meteorological control artificial wind systems 27 has no chemical reaction but discharges gas rather quietly.

3) The cost of aviation fuel is high, while that of compressed air is low.

4) It is questionable and relatively complex whether or not the retailed jet engine has got enough power to strike pollutants out of Delhi's temperature inversion layer. Some meteorologists questioned, "The atmospheric turbulence and friction will greatly reduce the jet engine's power to bring about the uplift stream", while the said meteorological control artificial wind systems 27 is much more powerful to produce an ascending airflow. There are many reasons.

Firstly, a retailed jet engine has an upper limit to its power and geometric dimension as it was designed to push the aircraft, while the said meteorological control artificial wind systems 27 can have much larger power and geometric dimension to design for a large quantity of high-speed and strong-force artificial wind.

Secondly, a jet engine has a combustion chamber pressure of a few MPa, such as 2 MPa (as an internal combustion engine, an jet engine has a combustion chamber temperatures up to 2000-3000° C. under which condition, it is difficult to withstand higher pressure even for the best material, wherein the maximum pressure of rocket engine is just about 20 MPa); while the said tubular structure of the compressed air storage device 1 in the meteorological control artificial wind systems 27 may not be affected by high temperature, and can be made of a new material, i.e. a new type of carbon fibre to withstand an extremely high stress, and the pressure of compressed air in such tubular structure of the compressed air storage device 1 can be maintained at ≥100 MPa even though the safety factor is 2.5, meaning that the working pressure in the said meteorological control artificial wind systems 27 is several times or several tens of times higher than that of a jet engine.

Thirdly, a jet engine has a very short tailpipe of its afterburner. A high-temperature and high-pressure gas is almost directly sprayed from its Laval nozzle, immediately facing the turbulence and friction in the atmosphere and no longer continuously being pumped under the gas pressure behind; while the said meteorological control artificial wind systems 27 has a very long or even extendedly long wind-blowing tube 13 tailing Laval nozzle 12 for its accelerated high/ultra-high pressure compressed air to be continuously pumped under the high/ultra-high pressure behind, and at a later time, with greater inertia force and momentum to generate wind at a relatively high altitude. Such a difference between a jet engine and the said meteorological control artificial wind systems 27 is just like the difference in barrel length between mortars and cannons to get their respective muzzle velocities and firing ranges differ by an order of magnitude.

Fourthly, the difference in temperature of the gas being ejected between the jet engine and the said meteorological control artificial wind systems 27 and its influence are additionally discussed in relation to the meteorological theory: "Under normal circumstances, atmospheric temperature decreases as the altitude increases, so that the warm air on the ground rises while the cold air at high altitude sinks, forming a convection to favour the dispersion of pollutants. In winter, however, it is prone to the opposite situation that atmospheric temperature increases as the altitude increases. This phenomenon is known as 'temperature inversion'. The atmosphere with temperature inversion occurring is referred to as temperature inversion layer, which appears like a 'lid' enveloped at high altitude to impede the air convection so that the pollutants cannot be dispersed but forming smog." A jet engine spouts to high altitude the combustion gas at high temperature (as high as over 2000° C.); the problem of temperature inversion layer has always been reflected in that "atmospheric temperature increases as the altitude increases", and spouting high-temperature combustion gas to high altitude increases the trouble with temperature inversion; if the warm air above is more and warmer to expand downward, the smog in the lower atmosphere become more concentrated. While the said meteorological control artificial wind systems 27 spouts to high altitude the high/ultra-high pressure compressed air at near-atmospheric temperature, which will drop its temperature due to rapid expansion (maybe even falling below zero degree Celsius), resulting in that "the cold air at high altitude sinks, forming a convection to favour the dispersion of pollutants" to destroy the temperature inversion layer and reduce the smog.

It has been reported that Prof. Moshe Alamaro was also fundraising for his experiment of several months. Since having entered 21st century, Mankind cannot always stay focusing passively on the weather forecast, but should take some steps toward an active control of the weather. Anyhow, Prof Moshe Alamaro's idea and exploration have a side complying with the direction of this era. As to whether and how the said meteorological control artificial wind systems 27 can be used to deal with smog, it can likely be discussed through computer simulations and experiments. People living in smog cities know that, as long as there is a little wind in fact, they can see the blue sky with white clouds.

Figure 4A:
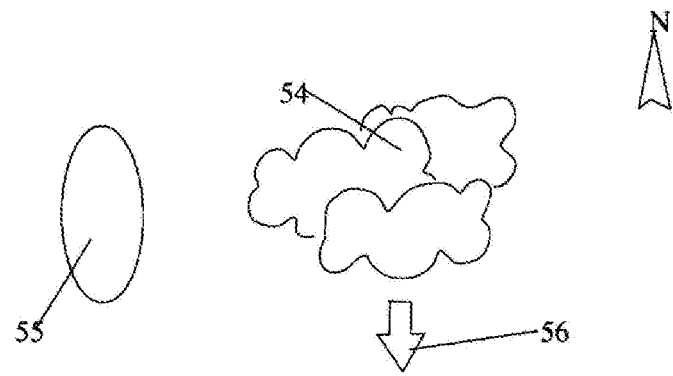
FIG. 4a is a schematic diagram of the meteorological control artificial wind system before meteorological control in Embodiment of this invention.
Figure 4B:
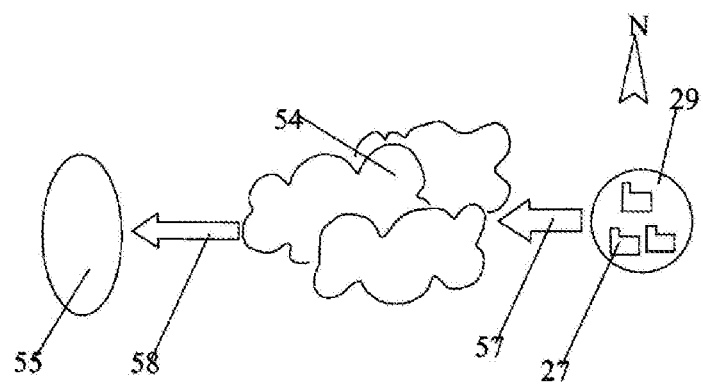
FIG. 4b is a schematic diagram of the meteorological control artificial wind system during meteorological control in Embodiment of this invention.
Figure 4C:
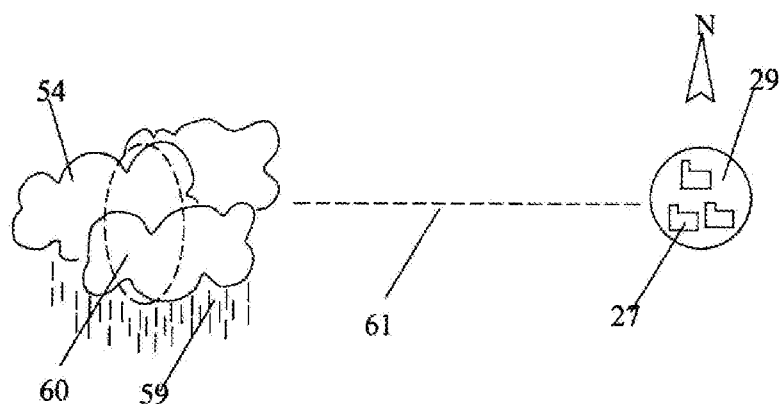
FIG. 4c is a schematic diagram of the meteorological control artificial wind system after meteorological control in Embodiment of this invention.

B. It is known that low-clouds family includes five categories, namely Cumulus (Cu), Cumulonimbus (Cb), Stratocumulus (Sc), Stratus (St) and Nimbostratus (Ns), and most of low clouds may rain. Among them, stratocumulus, stratus, and nimbostratus consist of water droplets, nimbostratus often continuously rains or snows, while cumulus and cumulonimbus consist of a mixture of water droplets, sub-cooling water droplets and ice crystals, and cumulonimbus results more in thunderstorms, sometimes with fierce wind and hail. Sometimes it can be read such as "Cumulonimbus incus sometimes is enhanced during its development due to the high speed wind at high altitude and its horizontal movement", and "Cumulonimbus drifts from the sea or other regions into this zone of stratiform clouds, which may form a mixed cloud system of cumulonimbus and stratiform in coexistence", and it can more often be seen that the clouds are drifting in the sky. Here we do not specifically refer to a certain category of clouds, but in accordance with a folk idiom simply term a cloud which may rain and drift as dark cloud 54. As shown in FIG. 4a, the drought in the western region is arid region 55, and the dark cloud 54 stays in the middle region with a trend of southward drift 56. As shown in FIG. 4b, at a practical setting point 29 in the east to dark cloud 54, artificial wind 57 from the said meteorological control artificial wind systems 27 acts to the east side of dark clouds 54 for its westward drift 58. As shown in FIG. 4c, dark cloud 54 drifts westward for a distance 61 and reaches the sky over the original arid region 60 and rains 59.

This invention also provides the firefighting equipment, comprising an extinguishing agent tank 47 and the compressed air artificial wind system described above. The wind-blowing tube 13 is provided at its one end close to the Laval nozzle 12 with a segment of oblique slit passage 43 which penetrates the wind-blowing tube wall 42 extending obliquely from the outside of the wind-blowing tube wall 42 toward the inside of the wind-blowing tube wall 42 and away from the Laval nozzle 12. The oblique slit passage 43 is communicated with the extinguishing agent tank 47 through an extinguishing solution transport pipeline 45, which forms a T-shaped connecting pipe with the wind-blowing tube 13 at the outer opening 44 of oblique slit passage 43. Preferably, the base bearing part of compressed air artificial wind system for forest firefighting described in this embodiment is a carrier base bearing part 22, mounted on the chassis of vehicle 26.

Wherein, the said oblique slit passage 43 has a running direction from its outer opening 44 to the inner opening 44a, forming a small acute angle with the direction of high-speed airflow 46 in wind-blowing tube 13, substantially complying with the direction of the high-speed airflow 46 in the wind-blowing tube 13. The extinguishing agent solution in use, such as the aqueous solution of various fire retardants, is stored in extinguishing agent tank 47, which can be arranged on a vehicle or beyond it; the extinguishing agent solution 47a under a pressure in the tank flows at low speed through the extinguishing solution transport pipeline 45 and the said oblique slit passage 43 into the wind-blowing tube 13, mixes with the high-speed airflow 46 ejected from Laval nozzle 12, then is ripped into extinguishing agent solution droplets 47b by the high-speed airflow 46 and mixed in the high-speed airflow 46, continues to advance along with the high-speed airflow 46, and finally spouts from the tube mouth 18 at the distal end of wind-blowing tube 13 sprayed onto a fire field far in the front, wherein the chemical agent of extinguisher reaches fire for anti-flaming, the spouted high/ultra-high pressure compressed air reaches fire with rapidly expanding with sudden dropping in temperature to cool the fire field, and water as a main component of extinguishing agent solution spreads over the fire field also cooling the combustibles and increasing their humidity, thus achieving fire extinguishing effects in a large area.

Wherein, the firefighting equipment may use the chassis of a large vehicle 26 as the base bearing part 22, such vehicle-mounted large-scale forest firefighting artificial wind system works at a relatively stationary position to spray the extinguishing agent solution to a large fire field; as well as the chassis of a small vehicle 26, which can pass over the complex terrain, may also be used as the base bearing part 22, carrying a vehicle-mounted small-scale forest firefighting artificial wind system to patrol around, track and spray for extinguishing scattered residual fire in the forest. The firefighting equipment can be additionally equipped with one or more associate wind-blowing tube 48 and the corresponding associate compressed air storage device 49, associate extinguishing agent tank 50 and associate extinguishing solution transport pipeline 51; vehicle 26 in use is assembled to use parking hoe 41 for its stillness and stabilization during operation.

In fighting forest fires, water (including it as the main component of the extinguishing agent solution) plays a crucial role. Theoretically, 0.04 g of water per square centimeter of surface area on charcoal can extinguish the charcoal fire. When the temperature of hot charcoal is 850° C., the water temperature must be below 38° C. before it can be contacted with it. Otherwise, it is simply impossible for water to contact the surface of the burning charcoal, thus it will not be able to extinguish the fire at all. This is actually a serious problem with forest firefighting. Because the forest fires occur frequently in hot and dry seasons, the water temperature is already high, and then small droplets of water sprayed over the fire field are further heated up by high-temperature air waves, causing its temperature inevitably higher than 38° C. to invalidate the watering. In particular, when using airborne spraying, an aircraft has a limited loading capacity as well as a limited area of spraying along its way. The small droplets of water sprayed after leaving the aircraft on the way is to be heated up over the fire, and, not to mention that their temperature may exceed 38° C., it is difficult to say whether the water droplets will have evaporated before landing, to make this expensive firefighting approach unreliable. While using the said forest firefighting artificial wind system, the extinguishing agent solution (water is its main component or can also be directly used) flows through the said oblique slit passage 43 into wind-blowing tube 13, mixes with the high-speed airflow 46 of high/ultra-high pressure compressed air ejected from Laval nozzle 12, and together spouts out from wind-blowing tube 13; on its way to the fire, the high/ultra-high pressure compressed air at near-atmospheric temperature has its temperature drop (even possibly below zero degree Celsius) due to its rapid expansion, not only cooling at once the mixed extinguishing agent solution and water droplets, but also getting the air temperature in the fire field drop, even down to below the ignition temperature of wood, to ensure the temperature of the extinguishing agent solution and water droplets below 38° C., to ensure the extinguishing agent solution and water droplets contacting the charcoal and wood and playing the fire extinguishing effect.

As shown in FIG. 1, FIGS. 3a and 3b, and FIG. 6, an air defence artificial wind system described in this embodiment has a compressed air storage device 1 of large capacity, a Laval nozzle 12 of good performance for air flow acceleration, and a long wind-blowing tube 13. Its base bearing part 22 may be a stationary base bearing part or a carrier base bearing part. There are several practical setting points 29 for the air defence artificial wind systems, in cooperation with each other fortified at the front or periphery of a military area, a political/economic center, or a transport junction. At each practical setting point 29, a plurality of the said air defence artificial wind systems may be provided in coordination and interlace with each other to eject to the sky an enough quantity of artificial wind of high/ultra-high pressure compressed air, with constant change in their directions, frequencies, intensity, and timely starting/stopping to spray high-speed airflows, which in the sky causes the "wind shear" of acute changes in wind direction and speed, and the "turbulence" formed by the extremely unstable high-speed airflows. The high/ultra-high pressure compressed air is discharged with its rapid expansion in the sky, causing its temperature to drop abruptly, cold air to sink and distribute, air pressure to rise and drop suddenly, and air temperature to change drastically. The wind-blowing tube 13 in the said air defence artificial wind system may be also provided with an oblique slit passage 43, where wind-blowing tube 13 is connected in a T-shaped tubular structure to a water pipe, through which water flows into the wind-blowing tube 13, and then the water droplets follow the high-speed airflow 46 together to spout from the tube mouth 18 at the distal end of the wind-blowing tube 13, so that, as the compressed air expands and its temperature drops at high altitudes, there is a large amount of supercooled water vapour. Thus, in a vast airspace with a certain width, height and length at high attitude, the major meteorological elements affecting the flight such as wind speed, direction and force, as well as air pressure, temperature, humidity and density, are all suddenly and drastically fluctuating to form a meteorological defence line at high altitude.

The said air defence artificial wind systems forms a meteorological defence line for wartime defence against the air strikes from enemy missiles and aircrafts;

Wherein, a sudden drastic fluctuation of wind speed, direction or force, air pressure, temperature, humidity or density alone or together occurring in the vast airspace of a meteorological defence line at high altitude is sufficient to act on a passing missile for veering off its pre-set flight path, so not to hit the pre-set goal. Since such a sudden drastic fluctuation of complex atmospheric phenomenon is unnatural and unpredictable, a navigation, guidance and attitude control is difficult to pre-set in any specific programming, the action of such a sudden drastic fluctuation of complex atmospheric phenomenon on the missile is very strong, so that it will be too difficult for the missile's tail stability mechanism or the vector thrust stability mechanism to restore the missile's precision from its direction deviation.

Wherein, the said sudden drastic fluctuation of complex atmospheric phenomenon also makes comprehensive damage to the stabilities of an enemy aircraft for attack, including its directional, vertical and horizontal stabilities. It is known that there is a certain exclusive relationship between the aircraft maneuverability and stability of an aircraft: If its focus position is rearward, the aircraft has a good stability but poor maneuverability; otherwise, if its focus position frontward, the aircraft has a poor stability but better maneuverability. For a superior maneuverability and flexibility, modern advanced fighters were designed to be aerodynamically unstable (with the aircraft's focus frontward), so that it is difficult for the enemy fighter, originally less stable, to use an active control technology for directing the aircraft in such unnaturally intense disturbing airflows to the initial flight status;

The enemy aircraft that broke into the airspace of the said meteorological defence line at high altitude will be in various strongly disturbed streams, rolling left and right, bumping up and down, shaking locally, difficult to maneuver, out of control or failing directly, especially to be severely damaged when the stream impact frequency resonates with aircraft body shaking; wherein fierce downdraft and the fluctuation of upwind-downwind along the aircraft heading may get the aircraft lose height, speed, and sufficient lift to fall to the ground. The liquid water below zero degree Celsius in the airspace of the meteorological defence line encounters the enemy aircraft fuselage to condense into ice, which will increase the aircraft weight and change the aircraft shape, resulting in decreased lift; moreover, the aircraft engine intakes excess water, which will cause the engine to work abnormally, flameout, fail and even crash.

Figure 7:
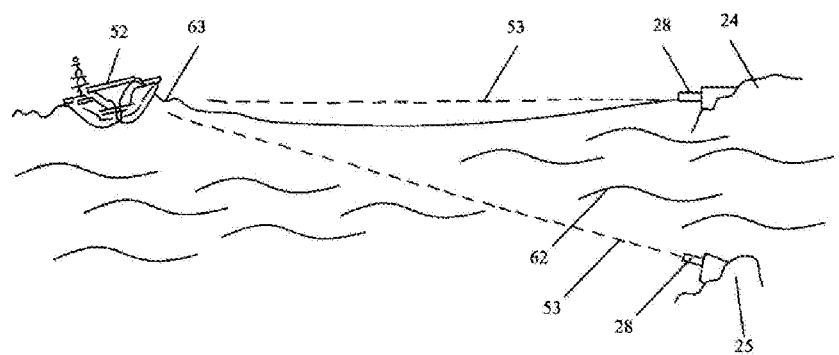
FIG. 7 is a schematic diagram of the coastal defense artificial wind system in Embodiment of this invention.

As shown in FIG. 7, there are several practical setting points of the coastal defence artificial wind systems 28 described in this embodiment, in cooperation with each other distributed on the coastal defence line for the important navigation passages. At each practical setting point one or more of the said coastal defence artificial wind systems 28 may be provided with their stationary base bearing parts fixed on corresponding island reef 24 exposed from the sea surface or seabed reef 25 of a certain depth below the sea surface 62. During wartime, the wind-blowing tubes of the said coastal defence artificial wind systems 28 guided by their cylinder-length, elevation and direction angle to aim at the side of invading enemy warship 52 spray a high-speed airflow artificial wind of high/ultra-high compressed air at a wind speed up to 400-500 m/s (times more than the wind speed of scale 12), that is, the artificial wind direction 53 points to the side of enemy warship 52, in a certain rhythm strongly disturbing the seawater to cause great fluctuations in the seawater from the sea surface to the downward. The direction of the fluctuating propagation is consistent with the artificial wind direction 53, flocking the side of the enemy warship 52, especially the seawater fluctuations 63 that propagate to the side of the enemy warship 52 to cause its resonance, making the enemy warship 52 roll severely and even overturn.

This present invention also provides a method for operating the compressed air artificial wind system, comprising the following steps:

S1, open inlet valve 7 of compressed air storage device 1, while close outlet valve 9 of compressed air storage device 1; make use of night off-peak or other powers difficult to store such as wind power or solar energy for high/ultra-high pressure air compressor 30 to pressurize and aerate air through air compressor discharge port 32 and the inlet 6 of compressed air storage device 1 into the compressed air storage device 1 in the large-scale flow water tank 31; control the pressure and volume of the air filled to suit the flow of cooling water 33 into water inlet 34 of large-sized flow water tank 31 and of hot water 35 from its water outlet 36, so that the heat generated in the production process of the compressed air in the compressed air storage device 1 is taken away by the cooling water 33 in time, and the cooling water 33 is heated to become hot water 35 at an appropriate temperature, flowing out of water outlet 36 at the right time to the heating system, until a large amount of compressed air, which is substantially remained at normal temperature in the compressed air storage device 1, reaches the designed high pressure, and storing it for future use.

S2, When the practical setting point 29 of compressed air artificial wind system is not at the site for compressed air production, compressed air storage device 1 is detached from large-scale flow water tank 31, and then covered by a compact and lightweight protective shell, transported by a vehicle or ship to a relevant practical setting point 29 of the compressed air artificial wind system, and connected and assembled with the corresponding compressed air discharge device 2, controller and artificial wind system base 3, and adjusted to be ready for use at the practical setting point 29 for compressed air artificial wind system. When practical setting point 29 of compressed air artificial wind system is at the site for compressed air production, compressed air storage device 1 is connected and assembled in situ with the corresponding compressed air discharge device 2, controller and artificial wind system base 3, and adjusted to be ready for use.

S3, The compressed air artificial wind systems for various usages controlled by respective controllers. A sufficient amount of high/ultra-high pressure compressed air stored in the compressed air storage device 1 is discharged through compressed air discharge device 2 to spray the artificial wind to the target direction for meteorological control, forest firefighting, air defence and coastal defence, respectively.

Finally, it should be noted that the above embodiments are merely used for describing the technical solutions of this invention, but not for limiting it. Although this invention is described in detail with reference to the foregoing embodiments, the ordinary technical personnel in the field of technology that modifications can be made to the technical solutions described in the foregoing embodiments, or equivalent replacements can be made to a part of the technical features. These modifications or replacements do not make the essence of the corresponding technical solutions depart from the spirit and scope of the technical solutions in the embodiments of this invention.

The invention claimed is:

1. A compressed air artificial wind system, wherein the compressed air artificial wind system includes a compressed air storage device, a compressed air discharge device, a controller and an artificial wind system base;
    the compressed air storage device includes a plurality of sets of row tubes and manifolds located an inlet and outlet ends of each set of the row tubes, wherein a plurality of manifolds corresponding to inlet ends of the plurality of sets of the row tubes are communicated with each other through a first connecting pipe, and a plurality of manifolds corresponding to outlet ends of the plurality of sets of the row tubes are communicated with each other through a second connecting pipe; the compressed air storage device further includes an inlet and an outlet, wherein the inlet is set on the manifold communicated with the inlet ends of the row tubes, and the outlet on the manifold communicated with the outlet ends of the row tubes; the inlet is equipped with an inlet valve for storing compressed air after its entering, and the outlet with an outlet valve for discharging the compressed air from the compressed air discharge device;
    the compressed air discharge device includes an intake pipe, an expansion chamber, a Laval nozzle and a wind-blowing tube; a first end of the intake pipe is communicated with the outlet of the compressed air storage device, and a second end of the intake pipe is communicated with a first end of the expansion chamber; an inner wall of the expansion chamber is provided with an air injection regulator which is used for regulating pressure and flow of compressed air injected into the expansion chamber from the intake pipe; a second end of the expansion chamber is communicated with a first end of the Laval nozzle, and the first end to a second end of the Laval nozzle sequentially includes a convergent section, a throat section and a divergent section, and the second end of the Laval nozzle is continuous with a proximal end of the wind-blowing tube and an distal end of the wind-blowing tube is a tube mouth opened to outside;
    the artificial wind system base is provided on a bottom of the compressed air artificial wind system and its bottom peripheral side; and
    the controller is used for controlling a sequential discharge of the compressed air from the compressed air storage device to the wind-blowing tube via an inlet pipe, the expansion chamber, and the Laval nozzle, and discharging in a target direction led by the wind-blowing tube.

2. The compressed air artificial wind system according to claim 1, wherein the expansion chamber is cylindrical or spherical.

3. A firefighting equipment, wherein the firefighting equipment includes an extinguishing agent tank and the compressed air artificial wind system according to claim 2; and
    wherein the wind-blowing tube is provided at its one end close to the Laval nozzle with a segment of an oblique slit passage which penetrates a wind-blowing tube wall extending obliquely from outside of the wind-blowing tube wall toward inside of the wind-blowing tube wall and away from the Laval nozzle, and the oblique slit passage is communicated with the extinguishing agent tank through an extinguishing solution transport pipeline, which forms a T-shaped connecting pipe with the wind-blowing tube at an outer opening of the oblique slit passage.

4. The compressed air artificial wind system according to claim 1, wherein the wind-blowing tube is a tubular structure with adjustable length.

5. The compressed air artificial wind system according to claim 4, wherein the wind-blowing tube is a telescopic tube including two or more sleeve sections sleeved together.

6. A firefighting equipment, wherein the firefighting equipment includes an extinguishing agent tank and the compressed air artificial wind system according to claim 5; and
    wherein the wind-blowing tube is provided at its one end close to the Laval nozzle with a segment of an oblique slit passage which penetrates a wind-blowing tube wall extending obliquely from outside of the wind-blowing tube wall toward inside of the wind-blowing tube wall and away from the Laval nozzle, and the oblique slit passage is communicated with the extinguishing agent tank through an extinguishing solution transport pipeline, which forms a T-shaped connecting pipe with the wind-blowing tube at an outer opening of the oblique slit passage.

7. A firefighting equipment, wherein the firefighting equipment includes an extinguishing agent tank and the compressed air artificial wind system according to claim 4; and
    wherein the wind-blowing tube is provided at its one end close to the Laval nozzle with a segment of an oblique slit passage which penetrates a wind-blowing tube wall extending obliquely from outside of the wind-blowing tube wall toward inside of the wind-blowing tube wall and away from the Laval nozzle, and the oblique slit passage is communicated with the extinguishing agent tank through an extinguishing solution transport pipeline, which forms a T-shaped connecting pipe with the wind-blowing tube at an outer opening of the oblique slit passage.

8. The compressed air artificial wind system according to claim 1, wherein the artificial wind system base includes a host chassis, a base connecting part and a base bearing part; the host chassis is a metal plate structure, and the compressed air storage device, the compressed air discharge device and the controller are provided on the host chassis, and the base connecting part is located below the host chassis and around the bottom of the host chassis, and a buffer shock-absorbing structure is provided between the base connecting part and the host chassis; the base bearing part is provided beneath the base connecting part.

9. The compressed air artificial wind system according to claim 8, wherein a base shaft is arranged between the base connecting part and the host chassis, wherein the base connecting part is fixedly connected with the base shaft, and the base shaft is rotatably connected with the host chassis through a bearing such that a direction of the wind-blowing tube of the compressed air discharge device can rotate in a plane with the base shaft as a center.

10. A firefighting equipment, wherein the firefighting equipment includes an extinguishing agent tank and the compressed air artificial wind system according to claim 9; and wherein the wind-blowing tube is provided at its one end close to the Laval nozzle with a segment of an oblique slit passage which penetrates a wind-blowing tube wall extending obliquely from outside of the wind-blowing tube wall toward inside of the wind-blowing tube wall and away from the Laval nozzle, and the oblique slit passage is communicated with the extinguishing agent tank through an extinguishing solution transport pipeline, which forms a T-shaped connecting pipe with the wind-blowing tube at an outer opening of the oblique slit passage.

11. The compressed air artificial wind system according to claim 8, wherein the base bearing part is land, island reef, seabed reef or vehicle chassis, wherein the vehicle chassis is a chassis for semi-tracked, tracked, wheel-type or railed vehicles, and a parking hoe for limiting vehicle movement is mounted at a rear end of the vehicles.

12. A firefighting equipment, wherein the firefighting equipment includes an extinguishing agent tank and the compressed air artificial wind system according to claim 11; and wherein the wind-blowing tube is provided at its one end close to the Laval nozzle with a segment of an oblique slit passage which penetrates a wind-blowing tube wall extending obliquely from outside of the wind-blowing tube wall toward inside of the wind-blowing tube wall and away from the Laval nozzle, and the oblique slit passage is communicated with the extinguishing agent tank through an extinguishing solution transport pipeline, which forms a T-shaped connecting pipe with the wind-blowing tube at an outer opening of the oblique slit passage.

13. A firefighting equipment, wherein the firefighting equipment includes an extinguishing agent tank and the compressed air artificial wind system according to claim 8; and wherein the wind-blowing tube is provided at its one end close to the Laval nozzle with a segment of an oblique slit passage which penetrates a wind-blowing tube wall extending obliquely from outside of the wind-blowing tube wall toward inside of the wind-blowing tube wall and away from the Laval nozzle, and the oblique slit passage is communicated with the extinguishing agent tank through an extinguishing solution transport pipeline, which forms a T-shaped connecting pipe with the wind-blowing tube at an outer opening of the oblique slit passage.

14. A firefighting equipment, wherein the firefighting equipment includes an extinguishing agent tank and the compressed air artificial wind system according to claim 1; and wherein the wind-blowing tube is provided at its one end close to the Laval nozzle with a segment of an oblique slit passage which penetrates a wind-blowing tube wall extending obliquely from outside of the wind-blowing tube wall toward inside of the wind-blowing tube wall and away from the Laval nozzle, and the oblique slit passage is communicated with the extinguishing agent tank through an extinguishing solution transport pipeline, which forms a T-shaped connecting pipe with the wind-blowing tube at an outer opening of the oblique slit passage.

15. A method of operating a compressed air artificial wind system, wherein the method comprises the following steps:

step one: opening inlet valve of a compressed air storage device, while closing outlet valve of the compressed air storage device; make use of night off-peak or other powers difficult to store such as wind power or solar energy for high/ultra-high pressure air compressor to pressurize and aerate air through air compressor discharge port and an inlet of the compressed air storage device into the compressed air storage device in a large-scale flow water tank; control pressure and volume of an air filled to suit a flow of cooling water into a water inlet of the large-scale flow water tank and of hot water from its water outlet, so that heat generated in a production process of compressed air in the compressed air storage device is taken away by the cooling water in time, and the cooling water is heated to become hot water at an appropriate temperature, flowing out of the water outlet at a right time to a heating system, until a large amount of compressed air, which is substantially remained at normal temperature in the compressed air storage device, reaches a designed high pressure, and storing it for future use;

step two: when a practical setting point of the compressed air artificial wind system is not at a site for compressed air production, the compressed air storage device is detached from the large-scale flow water tank, and then covered by a compact and lightweight protective shell, transported by a vehicle or ship to a relevant practical setting point of the compressed air artificial wind system, and connected and assembled with a corresponding compressed air discharge device, controller and artificial wind system base, and adjusted to be ready for use at the practical setting point for the compressed air artificial wind system; when the practical setting point of the compressed air artificial wind system is at the site for compressed air production, the compressed air storage device is connected and assembled in situ with the corresponding compressed air discharge device, controller and artificial wind system base, and adjusted to be ready for use;

step three: the compressed air artificial wind systems for various usages controlled by respective controllers, a sufficient amount of high/ultra-high pressure compressed air stored in the compressed air storage device is discharged through the compressed air discharge device to spray artificial wind to a target direction for meteorological control, forest firefighting, air defense and coastal defense, respectively.

* * * * *